(12) United States Patent
Thompson et al.

(10) Patent No.: US 11,255,430 B2
(45) Date of Patent: Feb. 22, 2022

(54) GEARING ASSEMBLIES AND APPARATUS

(71) Applicant: QinetiQ Limited, Hampshire (GB)

(72) Inventors: Robert William Thompson, Camberley (GB); Robert John Bonner Flaxman, Guildford (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 16/963,104

(22) PCT Filed: Jan. 16, 2019

(86) PCT No.: PCT/EP2019/051013
§ 371 (c)(1),
(2) Date: Jul. 17, 2020

(87) PCT Pub. No.: WO2019/141710
PCT Pub. Date: Jul. 25, 2019

(65) Prior Publication Data
US 2021/0071758 A1 Mar. 11, 2021

(30) Foreign Application Priority Data
Jan. 19, 2018 (GB) ..................... 1800890

(51) Int. Cl.
*F16H 3/66* (2006.01)
*F16H 63/30* (2006.01)
(Continued)

(52) U.S. Cl.
CPC ............. *F16H 63/30* (2013.01); *F16D 11/14* (2013.01); *F16D 21/00* (2013.01); *F16H 3/66* (2013.01);
(Continued)

(58) Field of Classification Search
CPC .... F16H 63/30; F16H 3/66; F16H 2063/3093; F16H 2200/0021; F16H 2200/0034;
(Continued)

(56) References Cited

U.S. PATENT DOCUMENTS 1,947,033 A 2/1934 Bush
3,386,302 A 6/1968 Ivanchich
(Continued)

FOREIGN PATENT DOCUMENTS

DE 102009023437 A1 12/2010
EP 2891821 A1 7/2015
(Continued)

OTHER PUBLICATIONS

Mar. 22, 2019 International Search Report issued in International Application No. PCT/EP2019/051013.
(Continued)

*Primary Examiner* — David J Hlavka
(74) *Attorney, Agent, or Firm* — Kenealy Vaidya LLP (57) ABSTRACT

Some embodiments are directed to a gearing assembly including a rotary input member, a rotary output member and a gearing arrangement between the input member and the output member selectively engageable to effect a driving engagement between the input member and the output member through at least a first torque connection having a first gear ratio and a second torque connection having a second gear ratio. One of the rotary input member and the rotary output member includes a first shaft and the first torque connection includes a first dog clutch including a dog hub having a hub set of teeth and a surrounding dog ring including a ring set of teeth. The hub and ring sets of teeth are radially projecting and mutually engageable. The dog hub is mounted on the first shaft so as to allow axial movement of the dog hub relative to the shaft.

20 Claims, 8 Drawing Sheets

(51) Int. Cl.
*F16D 11/14* (2006.01)
*F16D 21/00* (2006.01)
*B60K 7/00* (2006.01)
*B60K 17/02* (2006.01)
*B60K 17/04* (2006.01)
*B60K 17/08* (2006.01)

(52) U.S. Cl.
CPC ............ *B60K 7/0007* (2013.01); *B60K 17/02* (2013.01); *B60K 17/046* (2013.01); *B60K 17/08* (2013.01); *F16H 2063/3093* (2013.01); *F16H 2200/0021* (2013.01); *F16H 2200/0034* (2013.01); *F16H 2200/0039* (2013.01); *F16H 2200/201* (2013.01); *F16H 2200/2007* (2013.01); *F16H 2200/2012* (2013.01); *F16H 2200/2064* (2013.01); *F16H 2200/2094* (2013.01)

(58) Field of Classification Search
CPC ..... F16H 2200/0039; F16H 2200/2007; F16H 2200/201; F16H 2200/2012; F16H 2200/2064; F16H 2200/2094; F16H 2200/2038; F16H 2200/2097; F16D 11/14; F16D 21/00; F16D 2011/004; F16D 2011/006; F16D 11/08; F16D 11/10; F16D 21/04; B60K 7/0007; B60K 17/02; B60K 17/046; B60K 17/08; B60K 2007/0092; B60K 2007/0038; B60K 7/00
See application file for complete search history.

(56) References Cited

U.S. PATENT DOCUMENTS

| 3,600,962 | A | * | 8/1971 | Ivanchich | ............... F16H 3/095 74/331 |
| 4,791,825 | A | * | 12/1988 | von Kaler | ............... B60K 17/08 74/371 |
| 2015/0211633 | A1 | * | 7/2015 | Thompson | ............... F16H 63/18 74/362 |

FOREIGN PATENT DOCUMENTS

| GB | 697911 A | 9/1953 |
| GB | 2480891 A | 12/2011 |
| JP | H02-84110 A | 3/1990 |
| WO | 2016146628 A1 | 9/2016 |

OTHER PUBLICATIONS

Mar. 22, 2019 Written Opinion issued in International Application No. PCT/EP2019/051013.
Dec. 12, 2018 Great Britain Search Report issued in GB Application No. 1800890.4.
Jun. 21, 2018 Great Britain Search Report issued in GB Application No. 1800890.4.

* cited by examiner

GEARING ASSEMBLIES AND APPARATUS

CROSS REFERENCE TO RELATED APPLICATION(S)

This application is a national phase filing under 35 C.F.R. § 371 of and claims priority to PCT Patent Application No. PCT/EP2019/051013, filed on Jan. 16, 2019, which claims the priority benefit under 35 U.S.C. § 119 of British Patent Application No. 1800890.4, filed on Jan. 19, 2018, the contents of each of which are hereby incorporated in their entireties by reference.

BACKGROUND

Some embodiments relate to gearing assemblies and apparatus.

Gearing assemblies and apparatus of the present kind may be found useful in a variety of vehicular applications or in other machinery where a simple robust and compact gearbox is useful. Gearing assemblies are used commonly on vehicles where it is desired to drive a wheel or axle at a different rotational speed to the revolutions of an engine or motor. Assemblies of the present kind may find a particular application in a gearing system for an electrical hub drive and applications of the present systems are discussed herein in that context by way of example, although it should be noted that the presently disclosed subject matter is not limited to such applications.

Electric hub drive or hub mounted electric drive (HMED) units are finding increasing use in vehicles where it is advantageous for the wheels to be driven independently. Applications include, for example large vehicles and vehicles adapted for use on difficult, for example steep and uneven, terrain. HMED units are finding increasing use on hybrid vehicles. HMED units are finding increasing use on military vehicles particularly for use on difficult terrain.

In such a system each wheel is provided with a hub mounted electric drive assembly, typically including a housing containing an electric motor and a drive train including a drive shaft arranged inside a suitable hub mounted housing. An output shaft of the hub drive drives the wheel. The hub drive assembly can fit at least partly within space available inside the diameter and the overall width of the wheel rim and tyre assembly, in at least some cases.

The use of individual hub mounted electric drive units can eliminate the need for conventional transmission and drive shafts and can offer enhanced vehicle capabilities through improvements in vehicle performance, fuel economy, design configuration, increased stealth capability and reduced whole of life costs.

Generally an electric hub drive will be such that it needs to have a large torque range and a large speed range as well as desirably being compact. A multispeed gear change mechanism is desirable to facilitate this. Higher gear ratios can be used to provide higher torques at lower speeds and lower gear ratios can be used to allow for higher speeds (with low available output torque).

In providing gearing assemblies and apparatus for, amongst other things, use in such units, it is desirable if a compact design can be achieved and if there is flexibility in terms of the positioning of various parts of the gearing assembly and/or apparatus necessary to provide the different gear changes and where appropriate, flexibility for positioning controls operable by a user for controlling those gear changes.

In some previous designs of gearing assemblies or apparatus, two separate shift forks have been provided for making gear changes. One for operating a corresponding clutch on a first side of a driving motor of the system, and one for operating two separate clutches provided on a second side of the motor.

One example of such a gearing assembly is shown in WO2016/146628. In that device, three different gears are provided. Two of the gears are selectable by use of a first shift fork provided on one side of the motor using first and second dog clutches. In that arrangement, the dog clutches operate using mutually engageable axially extending teeth such that in order to engage the clutch, a dog hub carrying axially extending teeth is moved axially into engagement with corresponding teeth on the remainder of the clutch and in order to disengage the clutch, the dog hub is moved in the axially opposite direction. As such, axial movement of the dog hub to its maximum extent in one direction engages a first dog clutch whereas axial movement of the dog hub in the opposite axial direction to the maximum extent engages a second dog clutch. With the arrangement of WO2016/146628, in order to provide the third gear, a third dog clutch and a second shift fork for operating the third clutch are provided on the other side of the motor.

It would be desirable to provide gearing assemblies and apparatus which provide more flexibility in design and, for example can allow the provision of a more compact design and/or allow a choice of position for a shift fork associated with a respective clutch.

SUMMARY

Some embodiments therefore provide a gearing assembly including a rotary input member, a rotary output member and a gearing arrangement between the input member and the output member selectively engageable to effect a driving engagement between the input member and the output member through at least a first torque connection having a first gear ratio and a second torque connection having a second gear ratio, wherein one of the rotary input member and the rotary output member includes a first shaft and the first torque connection includes a first dog clutch including a dog hub including a hub set of teeth and a surrounding dog ring including a ring set of teeth, the hub and ring sets of teeth being radially projecting and mutually engageable, the dog hub being mounted on the first shaft so as to allow axial movement of the dog hub relative to the shaft and dog ring with rotation of the dog hub relative to the shaft being resisted such that when the dog hub is axially aligned with the dog ring, the hub and ring sets of teeth engage and rotational drive may be transferred between the first shaft and the dog ring, further wherein the hub and ring sets of teeth are dimensioned and spaced so that upon axial movement between the dog hub and the dog ring with the sets of teeth appropriately in register with one another, the teeth in each set may pass through spacings between the teeth in the respective other set, so that the dog hub is moveable between a first disengaged position with the hub set of teeth axially spaced in a first direction from the ring set of teeth, a first engaged position with the hub set of teeth aligned and engaged with the ring set of teeth, and a second disengaged position with the hub set of teeth axially spaced in a second direction from the ring set of teeth.

This arrangement allows the dog hub to pass through the dog ring so allowing a greater flexibility in the way that the gearing assembly can be arranged. This is because the dog hub may be moved axially in both directions away from the engaged position. This contrasts with the conventional dog clutches used in pre-existing systems which do not allow the dog hub to pass through an engaged position such as to allow only axial movement in one way away from the engaged position. Thus for example, as well as the dog hub being moveable into and out of engagement with the dog ring of the dog clutch of the first torque connection it may be moved to a position allowing use of a second torque connection, or a third torque connection, or even a higher number of independent connections. Further those connections might be via the same set of dog teeth on the dog hub or via a different set of teeth on the same dog hub, or via a different dog hub, or using a different type of clutch, or so on.

The second torque connection may include a second dog clutch including a respective dog hub including a respective hub set of teeth and a respective surrounding dog ring including a respective ring set of teeth, the respective hub and ring sets of teeth being radially projecting and mutually engageable.

In some embodiments the dog hub of the second dog clutch may be the same dog hub as the dog hub of the first dog clutch—to put this another way the first and second dog clutches may share a common dog hub. In such a case the dog hub will be moveable between the first engaged position in which driving engagement between the input member and the output member is effected through the first torque connection and a second engaged position in which driving engagement between the input member and the output member is effected through the second torque connection.

In some cases the dog hub may have a common hub set of teeth for selective engagement with the ring set of teeth of the first dog clutch and the ring set of teeth of a second dog clutch. In other cases the dog hub may include a first hub set of teeth for selective engagement with the ring set of teeth of the first dog clutch and a second hub set of teeth for selective engagement with the ring set of teeth of a second dog clutch.

In other embodiments the gearing assembly may include a plurality of dog hubs. The first torque connection may include a first dog hub. The second torque connection may include a second dog hub which is independent of the first dog hub.

The gearing assembly may include a plurality of clutches, say dog clutches, each associated with a respective torque connection.

In some cases the gearing assembly may include a plurality of dog clutches each of which includes a dog hub including a hub set of teeth and a surrounding dog ring including a ring set of teeth, the hub and ring sets of teeth being radially projecting and mutually engageable, and each of these may have the same overall construction as the first dog clutch.

In other cases at least one second or subsequent clutch may have a different construction from the first dog clutch. The at least one second or subsequent clutch may include a dog hub with axially extending teeth.

In one set of embodiments the gearing assembly may include a gearing arrangement between the input member and the output member selectively engageable to effect a driving engagement between the input member and the output member through at least a first torque connection having a first gear ratio, a second torque connection having a second gear ratio, and a third torque connection having a third gear ratio, wherein the first torque connection includes a first dog clutch, the second torque connection includes a second dog clutch, and the third torque connection includes a third dog clutch.

In a subset of those embodiments the first, second, and third dog clutches include a common dog hub which is arranged for movement axially between the first engaged position in which driving engagement between the input member and the output member is effected through the first torque connection, a second engaged position in which driving engagement between the input member and the output member is effected through the second torque connection, and a third engaged position in which driving engagement between the input member and the output member is effected through the third torque connection, wherein the first engaged position is axially between the second engaged position and the third engaged position.

In such a case the common dog hub may include a common set of hub teeth which is for selective engagement with the dog ring of the first dog clutch and respective dog rings of the second dog clutch and the third dog clutch. In such a case each dog clutch may be of the same overall design as the first dog clutch and for example the common hub set of teeth may be arranged so as to be able to pass through respective ring sets of teeth on each dog ring. In this way of course there may be one or more further dog clutch in addition to the three mentioned above, engagement of which may be reached by a further axial movement of the common dog hub.

Alternatively the second and/or third dog clutch may be of a different kind than the first dog clutch. Further the common dog hub may include two or more hub sets of teeth each for engaging with a corresponding remaining portion of at least one of the first, second, and third dog clutch. The second and/or third dog clutch may be arranged so as to not allow the dog hub to pass through a respective engaged position such as to allow only axial movement in one way away from the engaged position.

The second and/or third dog clutch may include axially extending dog teeth for achieving driving engagement between the dog hub and the remainder of the respective dog clutch. The dog teeth may include teeth provided on an axially facing face of the dog hub.

Where there is a plurality of dog clutches at least one of the dog clutches may be arranged to withstand a differing level of torque from at least another of the dog clutches.

At least one of the dog clutches may have a different diameter than at least one other of the dog clutches. This can help give higher torque transfer capability for gear ratios giving lower output speed, whilst minimising the space occupied by a dog clutch which is to carry drive at higher output speeds.

The first shaft and the dog hub may be provided with mutually engaging splines for mounting the dog hub on the shaft so as to allow relative axial movement whilst resisting relative rotational movement.

The or each dog ring may act as an output (or an input) of the gearing arrangement.

The gearing arrangement may include a planetary gear stage.

The gearing arrangement, which may include a planetary gear stage, may include at least one sun gear, which sun gear may include the dog ring of the first dog clutch.

The planetary gear stage may include a respective planetary gear carrier, which carrier may include the dog ring of the first dog clutch.

The gearing arrangement may include a plurality of planetary gear stages. Each planetary gear stage may include a sun gear, which sun gear includes the remainder of a respective dog clutch arranged for engagement with the respective hub set of dog teeth. Each sun gear may include a respective dog ring of one of the plurality of dog clutches.

Each planetary gear stage may include a planetary gear carrier.

The hub set of teeth and the ring set of teeth may be profiled to encourage ease of engagement whilst discouraging dis-engagement when under rotational driving load. The hub set of teeth and the ring set of teeth may be profiled to encourage ease of dis-engagement when not under rotational driving load.

The teeth of the hub set of teeth and/or the ring set of teeth may include radiused contact surfaces to encourage engagement.

The engaging surfaces of teeth of the hub set of teeth and the ring set of teeth may include complementary convex and concave surface portions such that when the sets of teeth are aligned, the convex portions on one set of teeth tend to rest in the concave portions of the other set of teeth so as to resist relative axial movement between the sets of teeth when under rotational load.

One set of teeth may include grooves into which a corresponding convex portions of the other set of teeth can project when the two sets of teeth are aligned and under rotational load. Preferably, where present, the grooves are provided in the hub set of teeth. Generally this will ease machining.

Some other embodiments provide gearing apparatus including a gearing assembly as defined above and a shift arrangement for shifting the gearing arrangement between a first state in which there is driving engagement between the input member and the output member through the first torque connection and a second state in which the gearing arrangement does not provide driving engagement between the input member and the output member through the first torque connection.

Preferably the shift arrangement includes at least one shift stick for acting on the gearing assembly for shifting the gearing arrangement between at least the first state and the second state and the at least one shift stick is carried in a slot in the outer surface of the first shaft and arranged for axial movement relative to the shaft for acting on the gearing assembly in shifting the gearing arrangement between the first state and the second state.

Some other embodiments provide a gearing apparatus including a gearing assembly including a rotary input member, a rotary output member and a gearing arrangement between the input member and the output member selectively engageable to effect a driving engagement between the input member and the output member through at least a first torque connection having a first gear ratio and a second torque connection having a second gear ratio,
the gearing apparatus further including a shift arrangement for shifting the gearing arrangement between a first state in which there is driving engagement between the input member and the output member through the first torque connection and a second state in which the gearing arrangement does not provide driving engagement between the input member and the output member through the first torque connection,
the shift arrangement including at least one shift stick for acting on the gearing assembly for shifting the gearing arrangement between at least the first state and the second state,
wherein one of the rotary input member and the rotary output member includes a first shaft and the at least one shift stick is carried in a slot in the outer surface of the first shaft and arranged for axial movement relative to the shaft for acting on the gearing assembly in shifting the gearing arrangement between the first state and the second state.

Preferably the gearing arrangement has a third state in which there is driving engagement between the input member and the output member through the second torque connection and the at least one shift stick is arranged for acting on the gearing assembly for shifting the gearing arrangement between at least the first state, the second state and the third state.

The shift arrangement may include a shift fork operable by a user for moving the at least one shift stick axially relative to the shaft so as to shift the gearing arrangement.

The shifting arrangement may include a plurality of shift sticks which are angularly spaced from one another around the first shaft.

The plurality of shift sticks may be arranged to act in parallel with one another on the gearing assembly. The plurality of shift sticks may be arranged to act independently of one another on the gearing assembly.

The plurality of shift sticks may be arranged in respective sets, with the or each shift stick in a respective set arranged to act in parallel with any other members of the set, whilst acting independently of the or each shift stick in any other set or sets.

The shift arrangement may include at least one pair of shift sticks which are arranged to act in parallel on the gearing assembly.

The pair of shift sticks may be disposed in respective slots which are diametrically opposed around the shaft.

Most likely if shift sticks are arranged in a pair there will be two pairs, each pair acting as a pair in parallel and independently of the other pair.

The shift arrangement may include three (or more) shift sticks which are arranged to act in parallel on the gearing assembly.

The three (or more) shift sticks may be disposed in respective slots which are equally spaced around the shaft.

The shift arrangement may include a shift ring which is arranged to transfer actuation from the shift fork to at least one shift stick. Where there are sets of shift sticks a separate respective shift ring may be provided for each set to facilitate independent control of each set.

The gearing assembly may include at least one clutch for use in shifting the gearing arrangement between states, the clutch including at least one clutch hub which is mounted on the first shaft so as to allow axial movement of the clutch hub relative to the shaft with rotation of the clutch hub relative to the shaft being resisted, wherein the at least one shift stick is arranged for acting on the at least one clutch hub for causing axial movement thereof.

The first torque connection may include a clutch hub mounted on the first shaft so as to allow axial movement of the clutch hub relative to the shaft whilst rotation of the clutch hub relative to the shaft is resisted and the shift arrangement may be arranged for causing axial movement of the clutch hub relative to the shaft under action of the at least one shift stick to shift the gearing arrangement at least between the first and the second state.

Where there are sets of shift sticks each set may be arranged for acting on a respective clutch hub. In this way each set of sticks may be used for axial movement of a respective clutch hub independently of the other clutch hubs.

Thus one set of sticks say may be used for controlling engagement of a first gear/torque connection by, for example, axial movement of a first clutch hub and another set of sticks say may be used for controlling engagement of a second gear/torque connection by, for example, axial movement of a second clutch hub.

The at least one clutch may be a dog clutch and the clutch hub may be a dog hub.

Generally the rotary output member will include the first shaft.

Some other embodiments provide a drive system including a gearing assembly or gearing apparatus as defined above in relation to some embodiments of the presently disclosed subject matter and a motor including a rotor and a stator.

The rotor of the motor may be journaled for rotation relative to the first shaft via a bearing provided around the first shaft, such that the first shaft passes through the bearing.

The rotor of the motor may be coupled to the rotary input member of the gearing assembly for providing rotary drive thereof.

The rotary output member may be coupled to a wheel or other body to which it is desired to provide rotational drive.

The gearing assembly may include a reduction gear, which may be separate from the gearing arrangement. Where it is separate from the gearing arrangement, the reduction gear may, for example, be provided in the drive train between the rotor of the motor and the rotary input member or between the rotary output member and the wheel or other body.

The gearing arrangement may be provided at a location spaced axially in a first direction from the motor rotor. A shift fork for operating the shift mechanism may be provided at a location spaced axially in a second, opposite, direction from the motor rotor.

Thus the at least one shift stick may pass from one side of the motor rotor to the other, by virtue of running in the axially extending slot provided in the first shaft. Thus the shift stick may pass through the bearing supporting the motor rotor.

This arrangement can help allow provision of a shift fork on a desired side of the motor irrespective of the which is the desired side for the gearing arrangement. Thus for example parts of the gearing arrangement might be conveniently be housed in space in a wheel hub whilst the shift fork is on the inboard side of the motor.

Similarly it can be convenient if part of the axial extent of the dog hub can be accommodated within the axial extent of the motor rotor when the hub is at an axially inward end (with respect to motor rotor location) of its travel.

In general, each of the optional features following each of the aspects of the presently disclosed subject matter above is equally applicable as an optional feature in respect of each of the other aspects of the presently disclosed subject matter and could be re-written after each aspect with any necessary changes in wording. Not all such optional features are re-written after each aspect merely in the interests of brevity.

BRIEF DESCRIPTION OF THE FIGURES

Embodiments of the presently disclosed subject matter will now be described, by way of example only, with reference to the accompanying drawings in which.

DETAILED DESCRIPTION OF EXEMPLARY EMBODIMENTS

Figure 1:
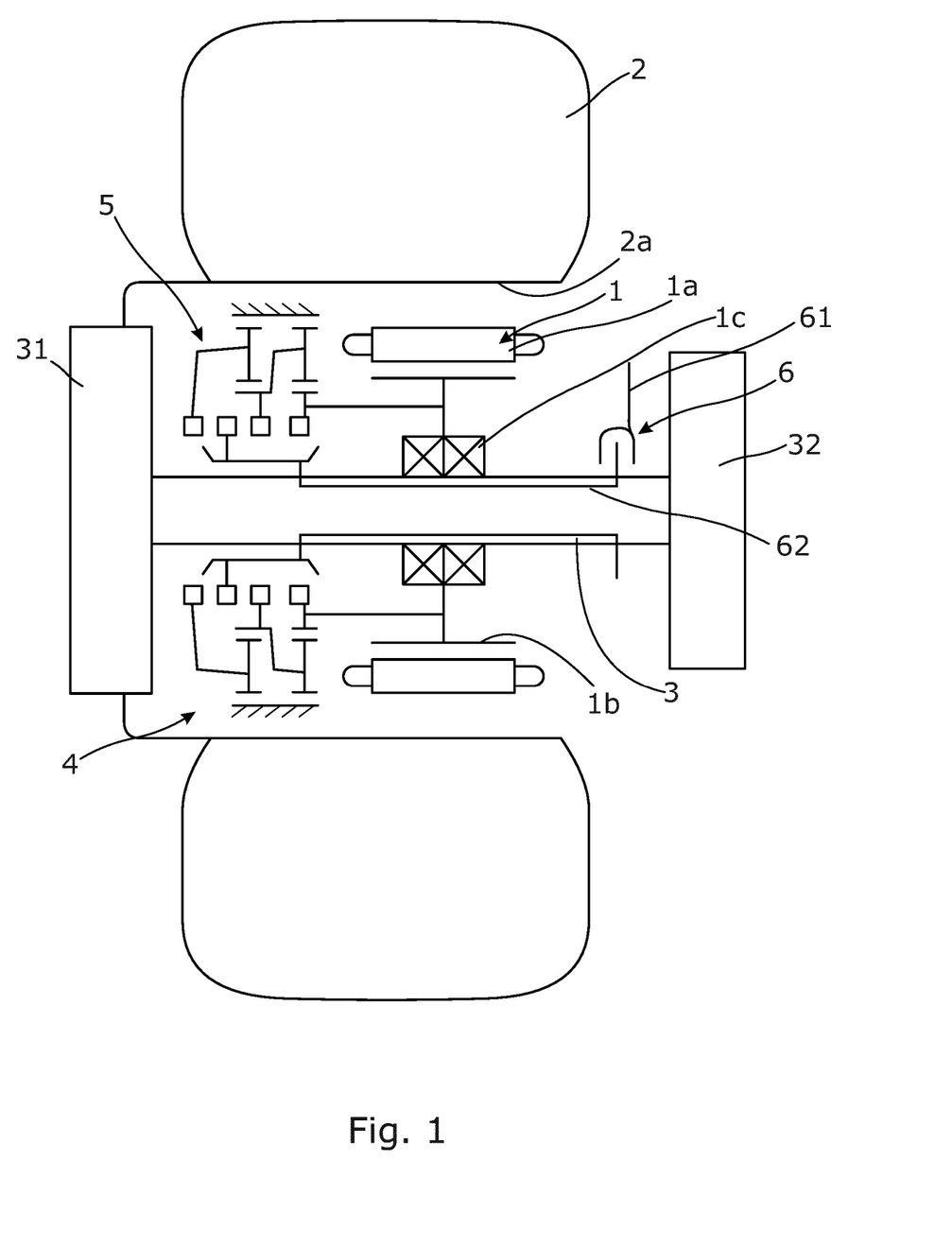
FIG. 1 shows a drive system in the form of a hub drive system and including gearing apparatus.

FIG. 1 schematically shows a drive system in the form of an electric hub drive. The hub drive includes an electric motor 1 for driving a wheel 2 and as can be seen schematically in FIG. 1, the majority of the hub drive may be housed in the hub 2a of the wheel 2. The motor 1 includes a stator 1a and a rotor 1b which is mounted for rotation via bearings 1c about an output shaft 3. The output shaft 3 is arranged for rotatingly driving the wheel 2 via a gear reduction stage 31. Further a braking system 32 is provided for breaking rotation of the output shaft 3 and hence rotation of the wheel 2. The structure and operation of the gear reduction stage 31 and braking system 32 are not particularly pertinent to the presently disclosed subject matter and detailed description thereof is omitted. Indeed, in some implementations the gear reduction stage and braking system might be omitted.

The hub drive system further includes gearing apparatus 4 which in turn includes a gearing assembly 5 and a shift arrangement 6 for acting on the gearing assembly 5 and changing between gears. The gearing assembly 5 includes the shaft 3 as a rotary output member.

Figure 2:
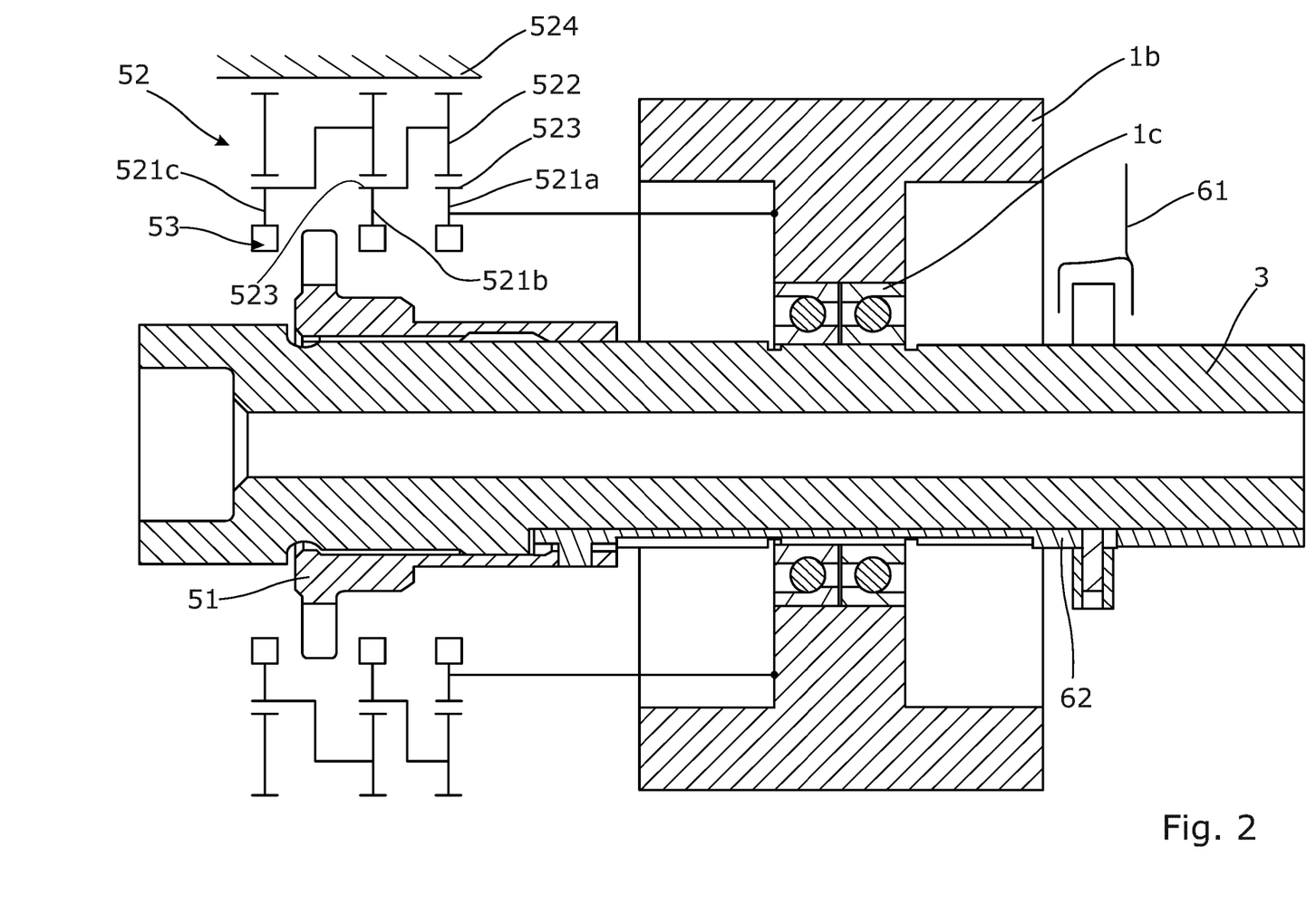
FIG. 2 schematically shows in more detail part of the gearing apparatus of the drive system shown in FIG. 1.

Considering now FIG. 2 as well as FIG. 1, the gearing assembly 5 includes a dog hub 51 which is mounted for axial movement relative to the output shaft 3 but with rotational movement between the dog hub 51 and shaft 3 resisted. In the present embodiment, this mounting is achieved via the provision of mutually engaging splines on the outer curved surface of the shaft 3 and in the bore of the dog hub 51.

The gearing assembly 5 also includes a gearing arrangement 52 which includes a plurality of planetary gear stages. Each planetary gear stage includes a sun gear 521a, 521b, 521c and planetary gears 522 carried on a respective planet carrier 523. A common fixed ring gear 524 is provided within which the planetary gears 522 can run. Each planet carrier 523 is borne on the sun gear 521b, 521c of the subsequent planetary gear stage.

A first of the sun gears 521a in the series is carried by the motor rotor 1b so as to rotate therewith. Each of the planetary gear stages act as a reduction gear. These gear stages preferably use planet gears which are small in comparison with the sun gear to give a relatively low reduction ratio of say in the order of 2.7:1 per stage.

In the present embodiment there are two gear stages of approximately 2.7:1 which therefore gives a mechanical ratio spread of approximately 7:1 and combined with a traction motor, this can give a range of approximately 20:1. This ratio spread is typical of that required for a high performance military vehicle, either a wheel driven vehicle with a hub drive or a tracked vehicle. For a vehicle with a lower power to weight ratio, a third planetary gear stage could be added to give an overall spread of approximately 50:1.

Where a planetary gear reduction is used with a ratio of approximately 2.7:1 and this has small planet gears, this will lead to relatively large sun gears. This is advantageous as it provides space inside the sun gears which can be used.

Each sun gear $521a$, $521b$, $521c$ includes a dog ring $53$ which is arranged for cooperation with the dog hub $51$ so as to act as a dog clutch. Each dog ring $53$ correspondingly acts as an output of the gearing arrangement $52$.

Figure 3A:
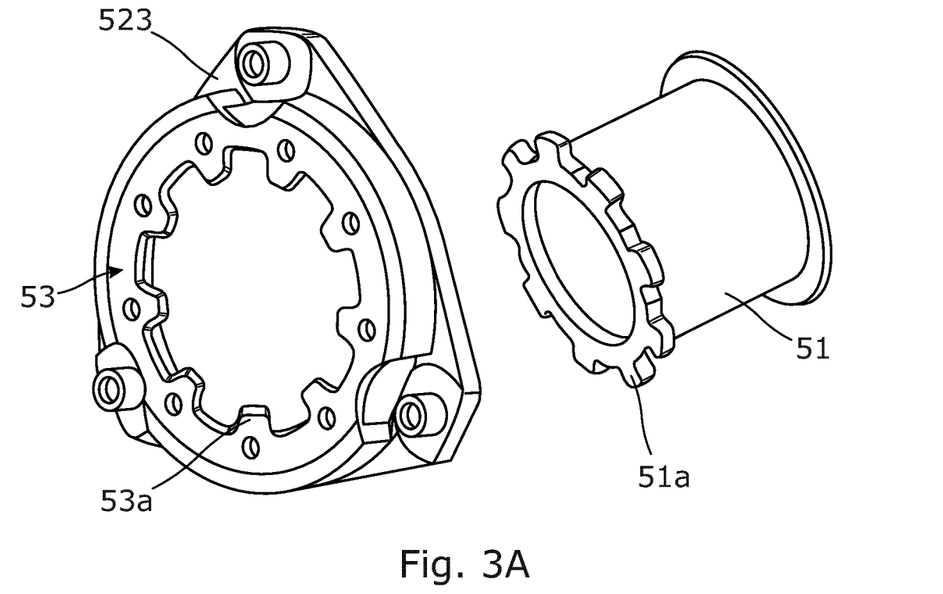
FIG. 3A and FIG. 3B show a dog hub and dog ring of the gearing apparatus shown in FIG. 2, with the dog hub and dog ring shown separately in FIG. 3A and shown in an engaged position in FIG. 3B.
Figure 3B:
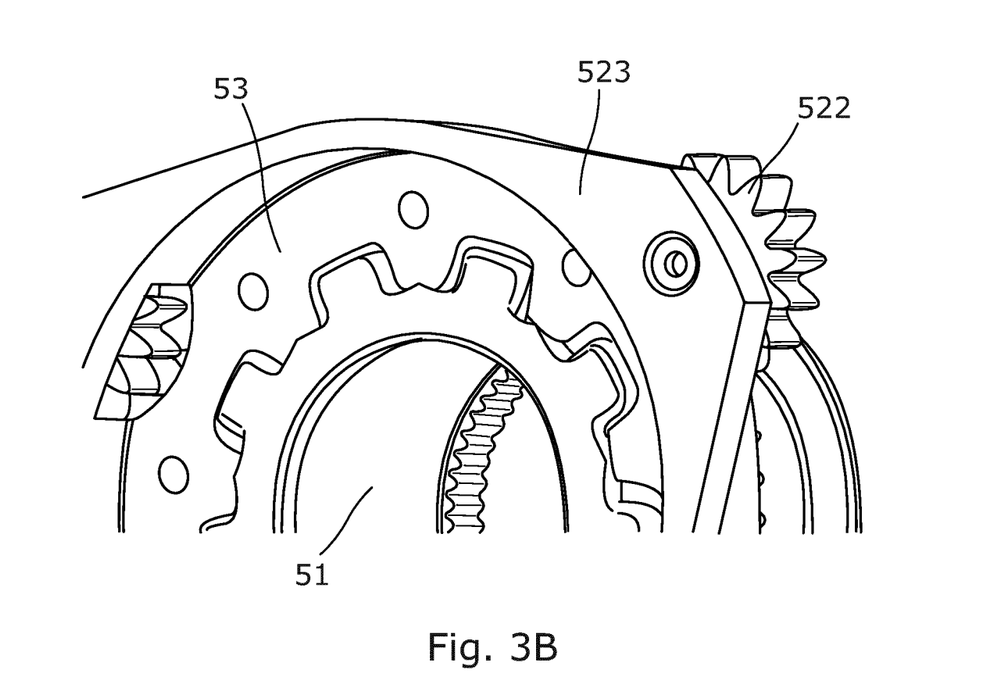

FIGS. 3A and 3B show the dog hub $51$ and one of the dog rings $53$ in isolation. In FIG. 3A these parts are shown separately from one another whereas in FIG. 3B they are shown engaged with one another. Incidentally, in FIG. 3B, the dog ring $53$ is shown carrying planetary gears $522$ whereas in FIG. 3A there are no planetary gears. Thus this corresponds to the dog ring $53$ carried by the first sun gear $521a$ which does not act as a planet carrier.

As can be seen most clearly in FIGS. 3A and 3B, the dog hub $51$ carries a hub set of dog teeth $51a$ and the dog ring $53$ carries a ring set of dog teeth $53a$. These sets of teeth are radially extending and arranged to mutually engage with one another as shown in FIG. 3B. That is to say the dog hub $51$ is arranged to engage with the dog ring $53$ when appropriately axially aligned with one another. Thus the dog hub $51$ may be moved axially between positions where it engages with the dog ring $53$ of the first sun gear $521a$ or the dog ring $53$ of the second sun gear $521b$ or the dog ring $53$ of the third sun gear $521c$. It will be appreciated that the dog hub $51$ may also be moved to intermediate positions where there is no engagement such that "neutral" positions can be adopted between gears. Furthermore the dog hub $51$ may be moved between all of these positions by use of the shift arrangement $6$ as will be described in more detail further below.

The teeth in the hub set of teeth $51a$ are provided on a curved circumferential surface of the dog hub $51$. Teeth in the ring set of teeth $53a$ are provided on a curved (inner) circumferential surface of the dog ring $53$. Each tooth has a root at the respective curved surface and projects radially therefrom.

The hub set of teeth $51a$ and ring sets of teeth $53a$ (a portion of which are shown in more detail in FIGS. 4A and 4B) are arranged to allow rotational drive to be transferred from the respective sun gear $521a$, $521b$, $521c$ to the output shaft $3$ via the dog hub $51$ when there is appropriate alignment. Further the teeth $51a$, $53a$ are arranged to allow engagement to be achieved by movement of the hub $51$ axially into alignment with the respective dog ring $53$ and to allow disengagement by axial movement away from that aligned position when not under rotational load.

Furthermore the sets of teeth $51a$, $53a$ are arranged so that the set of hub teeth $51a$ may pass through the set of ring teeth $53a$ when there is appropriate register between the sets of teeth. As will be appreciated, when engagement has been achieved as shown in FIG. 3B, the sets of teeth $51a$, $53a$ are in register and thus disengagement of the teeth by movement of the hub $51$ in either axial direction away from the engaging position is possible.

Thus the dog hub $51$ may be moved from a first position in which it is engaged with the dog ring $53$ of the second sun gear $521b$ to a first disengaged position which is axially to one side of its engaged position and to a second disengaged position which is axially to the other side of its first engaged position. Furthermore from the disengaged positons the dog hub $51$ may be moved to second and third engaged positions, that is respectively into engagement with the dog ring $53$ of the first sun gear $521a$ or the dog ring $53$ of third sun gear $521c$.

With the dog hub $51$ axially positioned so that its teeth $51a$ are engaged with the dog ring $53$ of the first sun gear $521a$, drive is provided directly from the motor rotor $1b$ to the output shaft $3$ via the dog ring $53$ of the first sun gear $521a$ and the dog hub $51$. Here the dog ring $53$ of the first sun gear $521a$ and the dog hub $51$ are acting as a first dog clutch.

When the dog hub $51$ is axially aligned with the dog ring $53$ of the second sun gear $521b$, then rotational drive from the motor rotor $1b$ occurs via the first planetary gear stage with the dog ring $53$ of the second sun gear $521b$ and the dog hub $51$ acting as a second dog clutch. Here there is a speed reduction so the output shaft $3$ rotates more slowly than the motor rotor $1b$.

Similarly when the dog hub $51$ is aligned with the dog ring $53$ of the third sun gear $521c$ then drive from the motor rotor $1b$ is provided to the shaft $3$ via two planetary gear stages with the dog ring $53$ of the third sun gear $521c$ and dog hub $51$ acting as a third dog clutch.

It will be appreciated that if a further planetary gear stage is provided then this may be engaged using the same mechanism. That is to say a fourth dog clutch arrangement may be provided with an appropriate dog ring carried on a fourth sun gear.

Thus one "common" dog hub $51$ and appropriate shift arrangement can be used to provide any number of gears desired. The hub set of teeth $51a$ and the ring set of teeth $53a$ are profiled to help with operation of the system. First facing edges of the teeth which will contact with the respective other set of teeth during engagement are radiused to reduce contact stress and help to guide the teeth into engagement with one another. These radiused portions can be seen for example in FIGS. 4A and 4B. On the hub set of teeth $51a$, radiused surfaces $51b$ are provided at outer edges of the teeth and side walls of the teeth. On the ring set of teeth $53a$ radiused surfaces $53b$ are provided at the tips of the teeth, in troughs between the teeth and on sidewalls of the teeth.

Figure 4A:
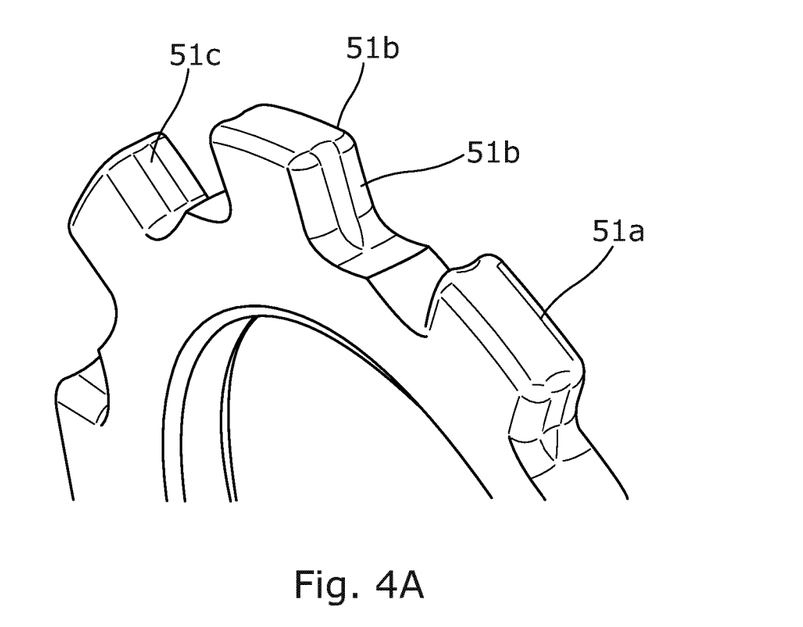
FIG. 4A and FIG. 4B show respectively in more detail the teeth provided on the dog hub (FIG. 4A) and the dog ring (FIG. 4B) of FIGS. 3A and 3B.
Figure 4B:
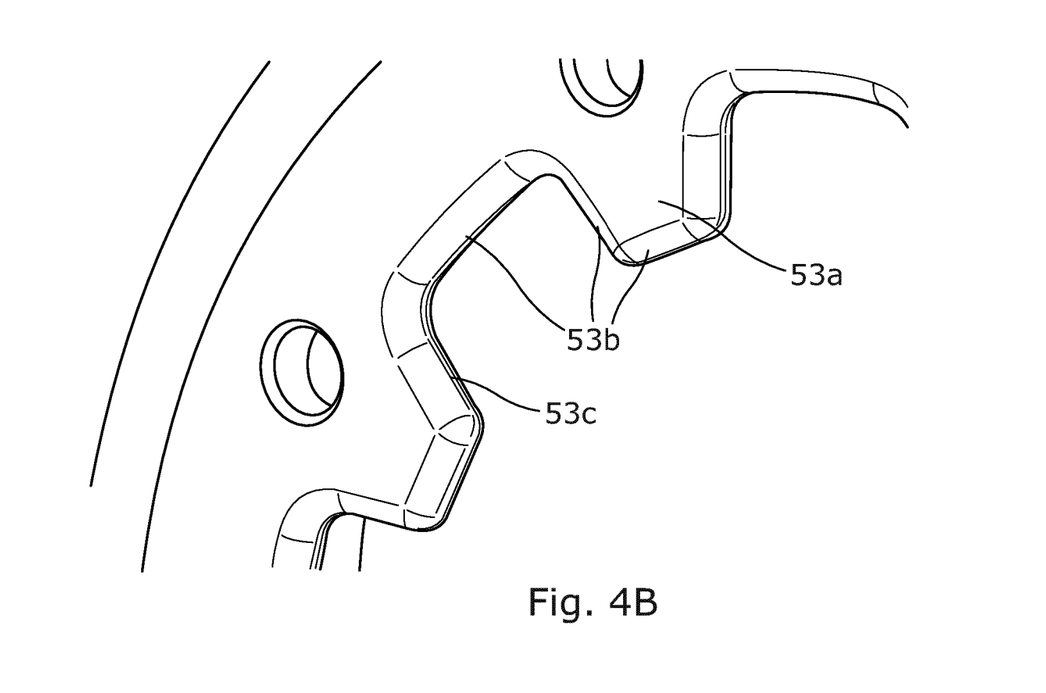

It will be noted that during engagement of the sets of teeth $51a$, $53a$ there will tend to be relative rotation between the dog hub $51$ and the dog ring $53$. These radiused surfaces $51b$, $53b$ are chosen with the aim of guiding the teeth into mutual engagement with one another.

Furthermore the respective sets of teeth $51a$, $53a$ are profiled to encourage engagement and alignment of the teeth to be maintained when under rotational load when the respective dog clutch is transferring load. In particular the mating surfaces of the teeth which transfer such load include complementary concave and convex portions which can rest in one another during rotational drive. In the present embodiment, the dog hub teeth $51a$ have a groove $51c$ provided in a side wall surface which is arranged to accept a corresponding convex portion $53c$ in the dog ring teeth $53a$ to help maintain alignment between the respective sets of teeth under rotational load. As will be appreciated, under rotational load, the convex portions $53c$ will tend to nestle into the concave groove portions 53c so resisting axial movement of the dog hub 51 out of engagement with the dog ring 53.

It will be appreciated that with the above described gearing assembly a shift fork might be provided for directly acting on the dog hub 51 for shifting its axial position to select the desired gears.

However in the present arrangement a different form of shifting arrangement 6 is provided. As schematically illustrated in FIG. 1 the shift arrangement 6 includes a shift fork 61 for accepting inputs from a user and at least one shift stick 62 for transmitting inputs from the shift fork 61 to the dog hub 51. The arrangement allows axial movement of the shift fork 61 to cause a corresponding axial movement of the dog hub 51.

In this case, whilst the dog hub 51 and gearing assembly 5 as a whole is provided on one side of the motor 1, the shift fork 61 is provided on the opposite side of the motor 1. This again allows more flexibility in the arrangement of the system and for example allows the provision of the shift fork 61 to be on an inboard side of the motor whereas the gearing arrangement is on the outboard side of the motor. This can help from an overall system design point of view. In addition this can help to lead to a more compact arrangement where, as can be seen for example by consideration of FIG. 2, part of the axial extent of the dog hub 51 may be accommodated at least partly within the axial extent of the motor rotor 1b. In the present case this is true at least when the dog hub 51 is in position which corresponds to it being retracted to its maximum extent towards the location of the motor 1.

Figure 5A:
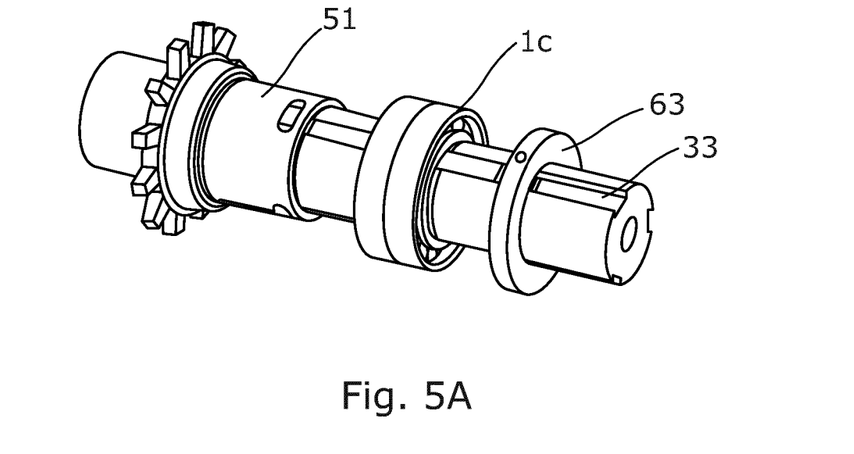
FIG. 5A shows in more detail part of a shift arrangement of the gearing apparatus of FIG. 2 in position on a shaft of the gearing apparatus.
Figure 5B:
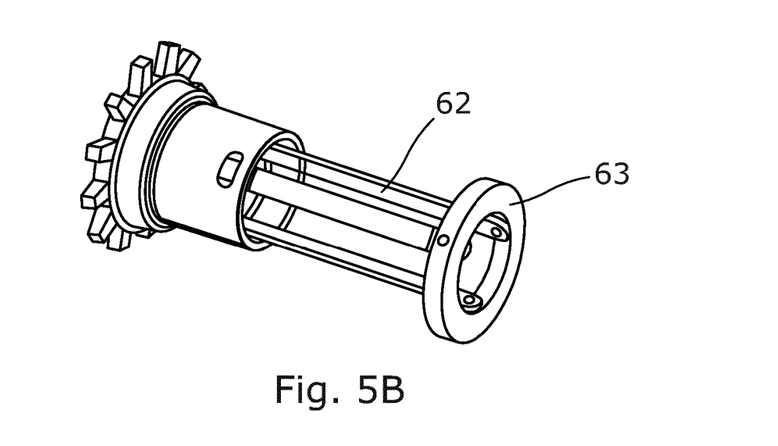
FIG. 5B shows part of the shift arrangement in isolation when not mounted on the shaft.
Figure 5C:
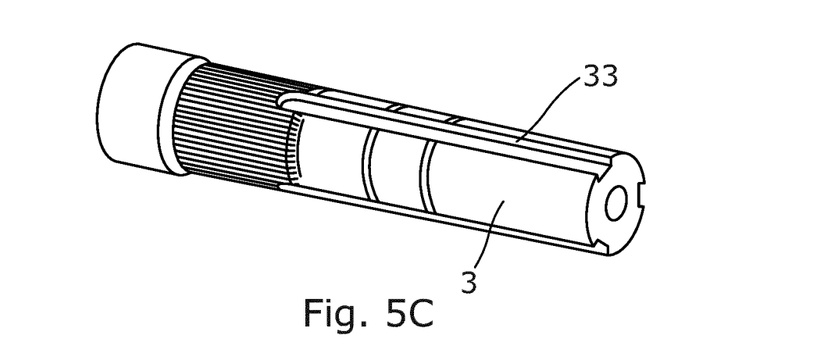
FIG. 5C shows the shaft in isolation without the shift arrangement in position.

More detail of the shift arrangement can be seen by consideration of FIGS. 5A, 5B and 5C as well as FIG. 2. The shift arrangement 6 includes a shift ring 63 to which are connected three shift sticks 62 with the remote end of the shift sticks 62 being connected to the dog hub 51. Each of the shift sticks 62 is located in a respective axial slot 33 provided in the outer curved surface of the shaft 3. These slots 33 and hence the shift sticks 62 may be equally spaced around the circumference of the shaft 3. In the current embodiment the shift sticks 62 are spaced in this way and thus are spaced 120° from each other. The slots for the shift sticks may be machined into the outer curved surface of the shaft 3. As can be seen by consideration of, for example FIG. 5A and FIG. 2, the shift sticks 62 pass through the interior of the bearing 1c and hence through the rotor 1b.

The shift ring 63 is arranged to be acted on via the shift fork 61 so the axial movement of the shift fork 61 will cause axial movement of the dog hub 51 via the shift ring 63 and the shift sticks 62.

It should be noted that in alternatives, different numbers of shift sticks 62 might be provided. Further if it is desired to provide independent control of more than one dog hub, independent shift sticks or sets of shift sticks might be provided with each stick or set for controlling a respective dog hub. Then each dog hub may have its own respective associated set of shift sticks 62 and respective shift ring 63 for control by a respective shift fork.

Figure 6:
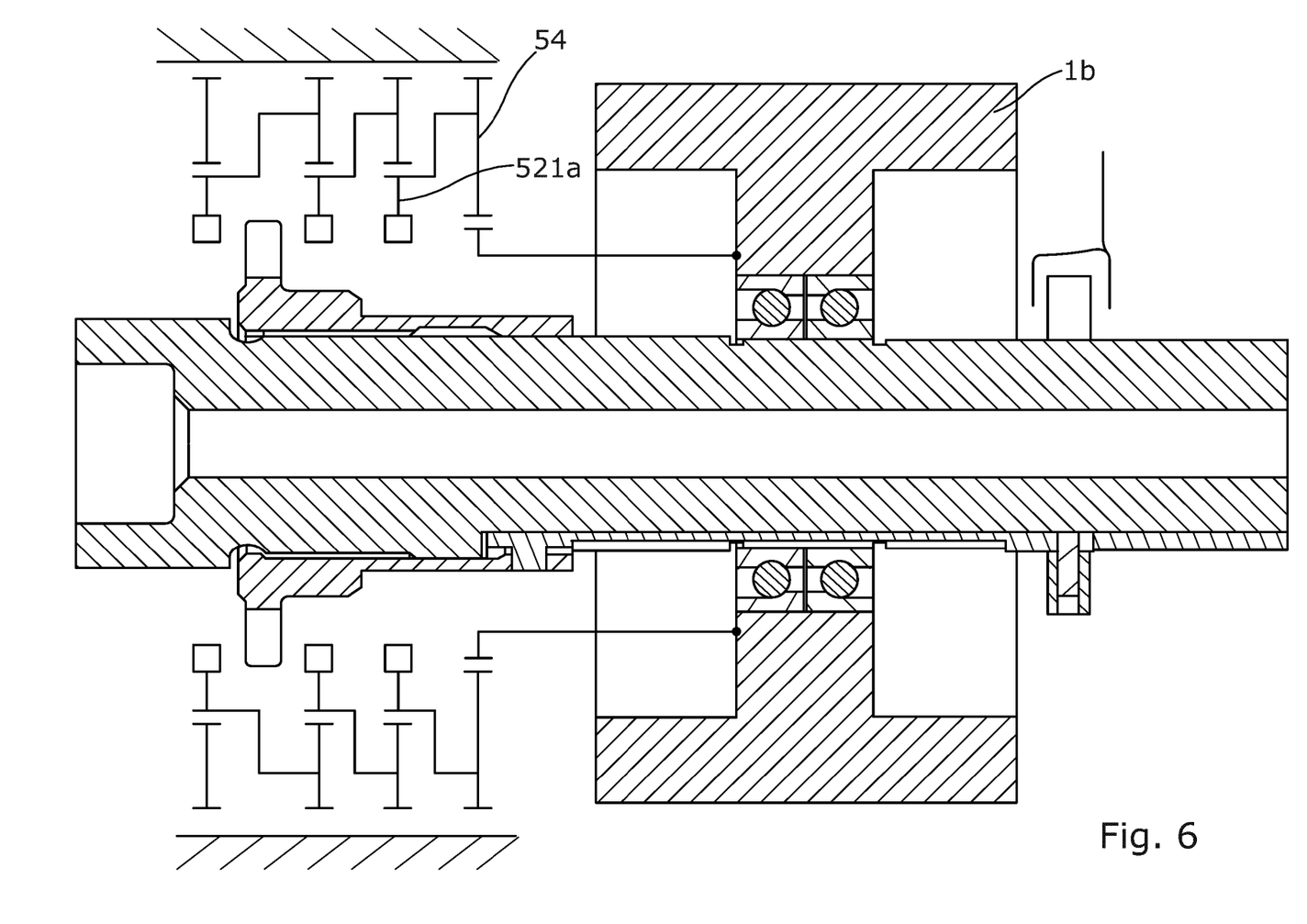
FIG. 6 schematically shows an alternative gearing apparatus which is similar to that shown in FIG. 2.

FIG. 6 shows an alternative gearing apparatus which is similar to that shown in FIG. 2. Detailed description of most of FIG. 6 is omitted for the sake of brevity with it being understood that those features not described are the same as those of the gearing apparatus shown in FIG. 2. The difference between the gearing arrangement shown in FIG. 6 and that shown in FIG. 2 is that an additional reduction gear stage 54 is provided between the motor rotor 1b and the remainder of the gearing arrangement 52. Thus the output of this first reduction gear 54 acts as the input to the first sun gear 521a such that the highest gear available is via this reduction gear 54 and all the other gears are reduced. With an arrangement such as this, the reduction gear arrangement 31 of FIG. 1 between the output shaft 3 and the wheel 2 to be driven might be omitted.

Figure 7:
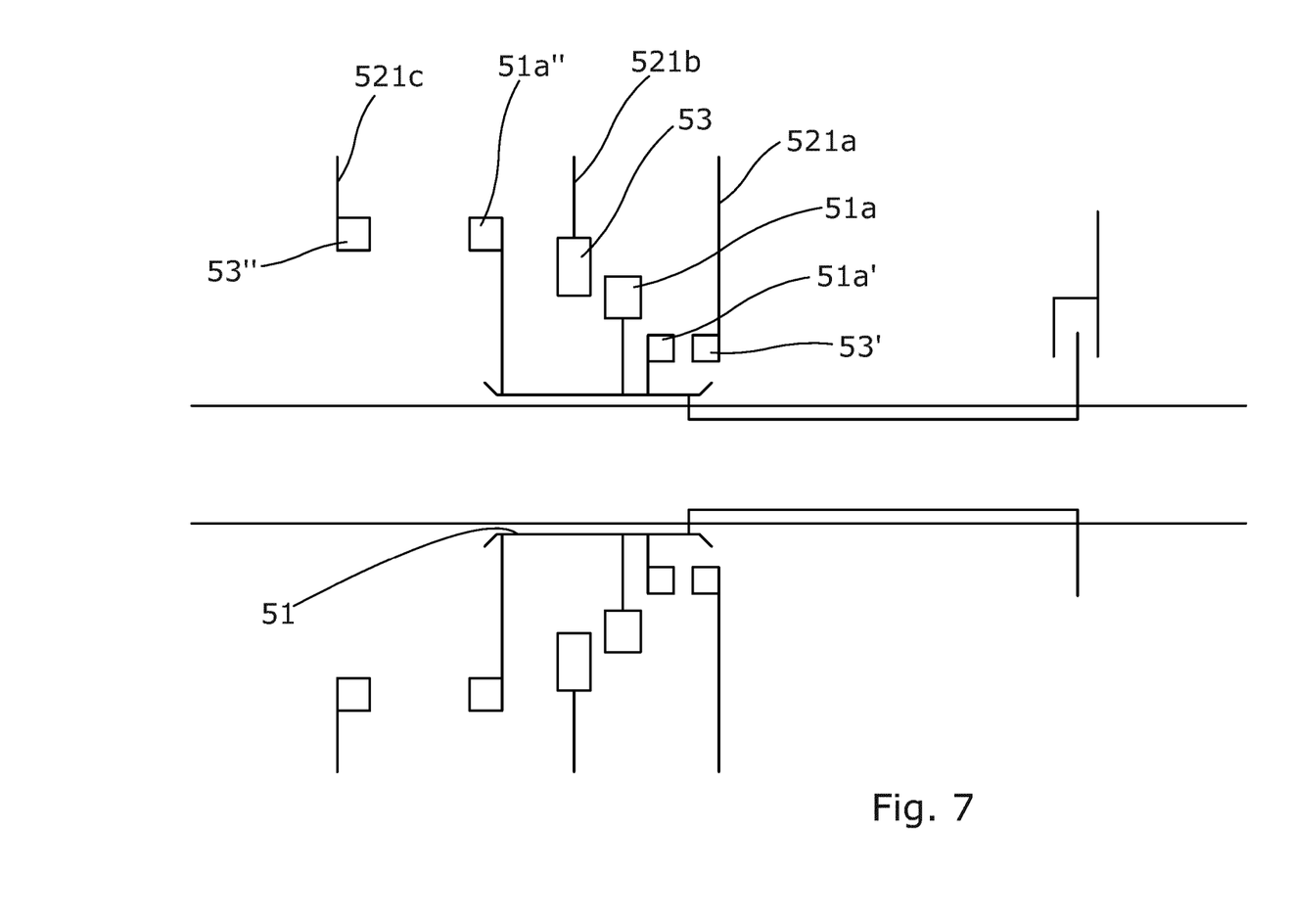
FIG. 7 shows yet another gearing apparatus which has some similarities with that shown in FIG. 2 but has a different arrangement of dog clutches.

FIG. 7 schematically shows yet another gearing apparatus. Again this is similar to that described above in relation to FIG. 2 and a detailed description of those parts in common is omitted with it to be understood that those parts not described are the same as in the apparatus of FIG. 2. Here a different form of gearing assembly 5 is provided where different forms of dog clutch are provided but otherwise the gearing assembly is as described in relation to FIGS. 2 to 5.

In this arrangement, the dog hub 51 carries separate sets of dog teeth 51a, 51a' and 51a". Further the sun gears of the gearing arrangement 52 carry different types of dog ring 53, 53' and 53".

The first set of dog teeth 51a is arranged for engagement with the dog ring 53 carried by the second sun gear 521b. This set of dog teeth 51a and dog ring 53 are of the type described above and shown, for example in FIGS. 3A and 3B. That is to say the respective dog teeth 51a, 53a are radially extending and arranged so that when aligned and engaged, rotational drive may be transmitted via the sets of dog teeth 51a, 53a and also so that the teeth may be moved out of axial alignment with each other in either direction away from the aligned position.

Figure 8:
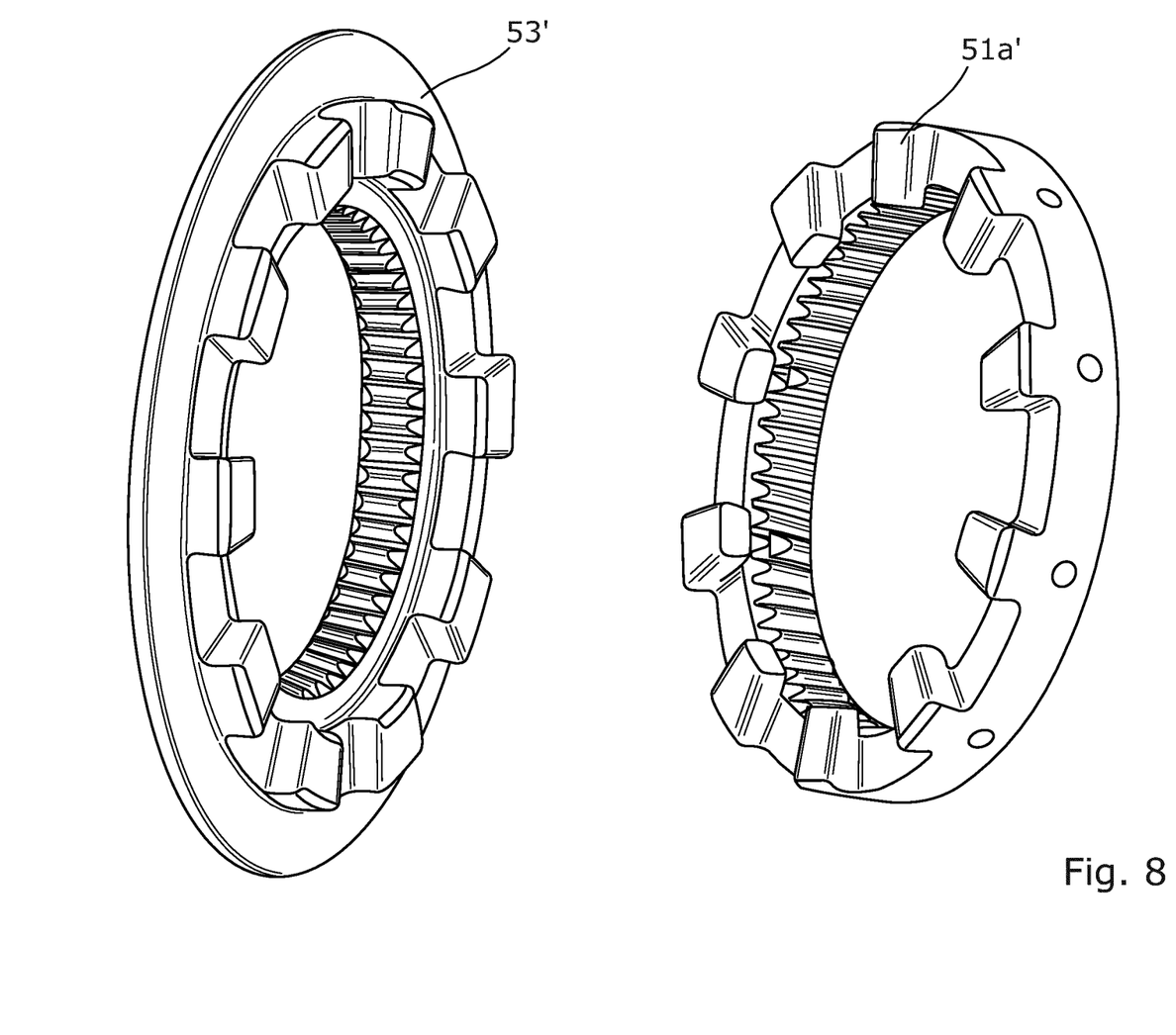
FIG. 8 shows the engaging components of dog clutches of the type which may be used in some of the dog clutches of the gearing apparatus shown in FIG. 7.

On the other hand the second and third sets of dog teeth 51a', 51a" provided on the dog hub 51 are of the more conventional axial extending type and are arranged for mutual engagement with corresponding axial sets of teeth 53', 53" provided on the first sun gear 521a and the third sun gear 521c. In this case these sets of teeth extend from axial faces on the dog hub 51, and sun gears 521a, 521c. FIG. 8 shows the type of dog teeth arrangements which may be used for these dog clutches.

Thus whilst the first dog clutch 53, 51a is one of the type where the two sets of dog teeth may pass through one another, the second 53', 51a' and third 53", 51a" dog clutches are ones where engagement is provided by axial movement in a first direction and disengagement can only be achieved by axial movement in the reverse direction.

Thus engagement of the second set of hub teeth 51a' with the corresponding dog ring 53' may be achieved with the dog hub 51 at one axial extent of its movement whilst engagement of the third set of hub teeth 51a" may be achieved with the corresponding dog ring 53" with the hub 51 at its opposite axial extent of travel. On the other hand engagement of the first dog clutch via the first set of dog teeth 51a and the appropriate dog ring 53 may be provided at an intermediate axial position of the dog hub 51.

In this way, again three different gears may be selectively engaged using axial travel of a common dog hub 51 to select each.

Further it will be appreciated that further dog rings 53 of the type shown in FIGS. 3A and 3B might be provided at other intermediate positions for engagement via the first set of dog teeth 51a (or indeed other sets of appropriate dog teeth) if it were desired to provide more gears.

Further note that what is relevant is the relative axial position of the dog hub at which a gear is engaged not the axial positions of the respective clutches. Thus while axially extending teeth type "one way" clutches need to be used at an end of axial travel of a common dog hub (if at all), they need not be provided at the axially outermost location. A "pass through" type clutch at the end of a line of clutches can still be engaged with the dog hub in an intermediate location—this being down to the location of the respective sets of teeth on the hub. Further in other cases multiple independent dog hubs might be used rather than a common dog hub.

Note that the arrangement shown in FIG. 7 might be advantageous in some circumstances in that whilst the first dog clutch 53, 51a provides the capability of having more than two gears with the provision of a single axially moveable dog hub, the use of the more conventional dog clutches 53', 51a'; 53", 51a" at either end of the dog hub 51 can facilitate the provision of different torque transfer capabilities of the dog clutches and/or the provision of different diameters of dog clutch which may be useful, bearing in mind available space requirements. Thus for example a larger diameter dog clutch may be used where greater torque transfer capabilities are required and/or where greater internal space within the dog clutch might be useful. Correspondingly a smaller diameter dog clutch might be used where lower torque transfer capabilities are required and/or where space outside of the dog clutch might be useful/required for some other purpose.

As alluded to above, whilst the shift arrangement and the dog clutch arrangements are used together in the above described embodiments, these ideas may be used separately. Thus the present type of dog clutch arrangement might be used in a system which does not make use of the particular shift arrangement described and similarly the particular shift arrangement described might be used in circumstances where only more conventional dog clutches are used. Thus whilst particular advantages can be obtained when these ideas are used together in terms of the overall flexibility and compactness of the gearing assembly and apparatus that can be achieved, these ideas are also useful separately from one another.

Note of course that whilst the above description has been written in terms of a hub drive system and the driving of a wheel, this is in no way essential. The current gearing assemblies and apparatus may be used in other types of drive system.

The invention claimed is:

1. A gearing assembly comprising a rotary input member, a rotary output member and a gearing arrangement between the input member and the output member selectively engageable to effect a driving engagement between the input member and the output member through at least a first torque connection having a first gear ratio and a second torque connection having a second gear ratio, wherein one of the rotary input member and the rotary output member comprises a first shaft and the first torque connection comprises a first dog clutch comprising a dog hub comprising a hub set of teeth and a surrounding dog ring comprising a ring set of teeth, the hub and ring sets of teeth being radially projecting and mutually engageable, the dog hub being mounted on the first shaft so as to allow axial movement of the dog hub relative to the first shaft and dog ring with rotation of the dog hub relative to the first shaft being resisted such that when the dog hub is axially aligned with the dog ring, the hub and ring sets of teeth engage and rotational drive may be transferred between the first shaft and the dog ring, the hub and ring sets of teeth of the first dog clutch being dimensioned and spaced so that upon axial movement between the dog hub and the dog ring with the sets of teeth appropriately in register with one another, the teeth in each set may pass through spacings between the teeth in the respective other set, so that the dog hub is moveable between a first disengaged position with the hub set of teeth axially spaced in a first direction from the ring set of teeth, a first engaged position with the hub set of teeth aligned and engaged with the ring set of teeth, and a second disengaged position with the hub set of teeth axially spaced in a second direction from the ring set of teeth, and wherein the gearing arrangement comprises a first planetary gear stage having a sun gear which comprises the dog ring of the first dog clutch.

2. The gearing assembly according to claim 1, wherein the second torque connection comprises a second dog clutch comprising a respective dog hub comprising a respective hub set of teeth and a respective surrounding dog ring comprising a respective ring set of teeth, the respective hub and ring sets of teeth being radially projecting and mutually engageable, the gearing arrangement comprising a second planetary gear stage having a sun gear which comprises the dog ring of the second dog clutch and wherein the dog ring of the second dog clutch comprises a planetary gear carrier of the first planetary gear stage.

3. The gearing assembly according to claim 2, wherein the first and second dog clutches share a common dog hub, which is moveable between the first engaged position in which driving engagement between the input member and the output member is effected through the first torque connection and a second engaged position in which driving engagement between the input member and the output member is effected through the second torque connection.

4. The gearing assembly according to claim 3, wherein the dog hub has a common hub set of teeth for selective engagement with the ring set of teeth of the first dog clutch and a ring set of teeth of the second dog clutch.

5. The gearing assembly according to claim 3, wherein the dog hub comprises a first hub set of teeth for selective engagement with the ring set of teeth of the first dog clutch and a second hub set of teeth for selective engagement with a ring set of teeth of a second dog clutch.

6. The gearing assembly according to claim 1, wherein the gearing assembly comprises a gearing arrangement between the input member and the output member selectively engageable to effect a driving engagement between the input member and the output member through at least a first torque connection having a first gear ratio, a second torque connection having a second gear ratio, and a third torque connection having a third gear ratio, wherein the first torque connection comprises a first dog clutch, the second torque connection comprises a second dog clutch, and the third torque connection comprises a third dog clutch.

7. The gearing assembly according to claim 6, wherein the first, second, and third dog clutches comprise a common dog hub which is arranged for movement axially between the first engaged position in which driving engagement between the input member and the output member is effected through the first torque connection, a second engaged position in which driving engagement between the input member and the output member is effected through the second torque connection, and a third engaged position in which driving engagement between the input member and the output member is effected through the third torque connection, wherein the first engaged position is axially between the second engaged position and the third engaged position.

8. The gearing according to claim 7, wherein the common dog hub comprises a common set of hub teeth which is for selective engagement with the dog ring of the first dog clutch and respective dog rings of the second dog clutch and the third dog clutch.

9. The gearing assembly according to claim 7, wherein the second and/or third dog clutch are of a different kind than the first dog clutch and the common dog hub comprises two or more hub sets of teeth each for engaging with a corresponding remaining portion of at least one of the first, second, and third dog clutch.

10. The gearing assembly according to claim 1, wherein the hub set of teeth and the ring set of teeth are profiled to encourage ease of engagement whilst discouraging disengagement when under rotational driving load.

11. The gearing assembly according to claim 1, wherein the teeth of the hub set of teeth and/or the ring set of teeth comprise radiused contact surfaces to encourage engagement.

12. The gearing assembly according to claim 1, wherein engaging surfaces of teeth of the hub set of teeth and the ring set of teeth comprise complementary convex and concave surface portions such that when the sets of teeth are aligned, the convex portions on one set of teeth tend to rest in the concave portions of the other set of teeth so as to resist relative axial movement between the sets of teeth when under rotational load.

13. A gearing apparatus comprising the gearing assembly according to claim 1 and a shift arrangement for shifting the gearing arrangement between a first state in which there is driving engagement between the input member and the output member through the first torque connection and a second state in which the gearing arrangement does not provide driving engagement between the input member and the output member through the first torque connection.

14. The gearing apparatus according to claim 13, wherein the shift arrangement comprises at least one shift stick for acting on the gearing assembly for shifting the gearing arrangement between at least the first state and the second state and the at least one shift stick is carried in a slot extending axially in the outer surface of the first shaft and arranged for axial movement therewithin relative to the first shaft for acting on the gearing assembly in shifting the gearing arrangement between the first state and the second state.

15. A gearing apparatus comprising a gearing assembly comprising a rotary input member, a rotary output member and a gearing arrangement between the input member and the output member selectively engageable to effect a driving engagement between the input member and the output member through at least a first torque connection having a first gear ratio and a second torque connection having a second gear ratio, the gearing apparatus further comprising a shift arrangement for shifting the gearing arrangement between a first state in which there is driving engagement between the input member and the output member through the first torque connection and a second state in which the gearing arrangement does not provide driving engagement between the input member and the output member through the first torque connection, the shift arrangement comprising at least one shift stick for acting on the gearing assembly for shifting the gearing arrangement between at least the first state and the second state, wherein one of the rotary input member and the rotary output member comprises a first shaft and the at least one shift stick is carried in a slot extending axially in the outer surface of the first shaft and arranged for axial movement therewithin relative to the first shaft for acting on the gearing assembly in shifting the gearing arrangement between the first state and the second state.

16. The gearing apparatus according to claim 14, wherein the gearing arrangement has a third state in which there is driving engagement between the input member and the output member through the second torque connection and the at least one shift stick is arranged for acting on the gearing assembly for shifting the gearing arrangement between at least the first state, the second state and the third state.

17. The gearing apparatus according to claim 14, wherein the shifting arrangement comprises a plurality of shift sticks which are angularly spaced from one another around the first shaft and disposed in respective slots extending axially in the outer surface of the first shaft.

18. The gearing apparatus according to claim 17, wherein the plurality of shift sticks are arranged in respective sets, with the or each shift stick in a respective set arranged to act in parallel with any other members of the set, whilst acting independently of the or each shift stick in any other set or sets.

19. The gearing apparatus according to claim 15, further comprising at least one clutch for use in shifting the gearing arrangement between states, the clutch comprising at least one clutch hub which is mounted on the first shaft so as to allow axial movement of the clutch hub relative to the first shaft with rotation of the clutch hub relative to the first shaft being resisted, wherein the at least one shift stick is arranged for acting on the at least one clutch hub for causing axial movement thereof.

20. The gearing assembly according to claim 1, further including a motor comprising a rotor and a stator, wherein the gearing arrangement is provided at a location spaced axially in a first direction from the motor rotor and a shift fork for operating the shift mechanism is provided at a location spaced axially in a second, opposite, direction from the motor rotor.

* * * * *